(12) United States Patent
Mans et al.

(10) Patent No.: US 9,832,844 B2
(45) Date of Patent: Nov. 28, 2017

(54) SYSTEM FOR CONFIGURING A LIGHTING CONTROL DEVICE OR THE LIKE IN A NETWORK OF LIGHTING CONTROL DEVICES

(75) Inventors: Paul Mans, Hertfordshire (GB); Merlin Milner, East Sussex (GB)

(73) Assignee: Legrand Electric Limited, Birmingham (GB)

( * ) Notice: Subject to any disclaimer, the term of this patent is extended or adjusted under 35 U.S.C. 154(b) by 1101 days.

(21) Appl. No.: 13/502,197

(22) PCT Filed: Jun. 18, 2010

(86) PCT No.: PCT/GB2010/051011
§ 371 (c)(1),
(2), (4) Date: Jun. 28, 2012

(87) PCT Pub. No.: WO2011/045576
PCT Pub. Date: Apr. 21, 2011

(65) Prior Publication Data
US 2012/0271618 A1    Oct. 25, 2012

(30) Foreign Application Priority Data

Oct. 16, 2009    (GB) .................................. 0918107.4

(51) Int. Cl.
*H02J 13/00*    (2006.01)
*H05B 37/02*    (2006.01)
*H04L 29/08*    (2006.01)

(52) U.S. Cl.
CPC ......... *H05B 37/0254* (2013.01); *H04L 67/12* (2013.01); *H04L 67/125* (2013.01); *H04L 67/14* (2013.01)

(58) Field of Classification Search
CPC ............ G03B 15/03; G03B 2215/0592; H05B 37/0254; H04L 67/125; H04L 67/12; H04L 67/14
(Continued)

(56) References Cited

U.S. PATENT DOCUMENTS 5,491,463 A * 2/1996 Sargeant ................ H04B 3/542
340/12.37
2001/0000422 A1 * 4/2001 Sid ..................... H05B 37/0254
315/293
(Continued)

FOREIGN PATENT DOCUMENTS

EP    1 292 175    3/2003
WO    03/094579    11/2003
(Continued)

OTHER PUBLICATIONS

Translation of EP001292175A1, Huber Dec. 3, 2003.*
International Search Report for corresponding patent application No. PCT/GB2010/051011 dated Aug. 30, 2010.

*Primary Examiner* — Edwin Holloway, III
(74) *Attorney, Agent, or Firm* — Renner, Otto, Boisselle & Sklar, LLP

(57) ABSTRACT

An addresser for configuring an electronic ballast/lighting control device in a network of electronic ballasts/lighting control devices; said addresser comprises a first connection to allow the receipt of communication from a controller; a second connection to allow communication from the addresser to an individual electronic ballast/lighting control device; an interface for communicating with a programming device; and means for configuring the communication between said first and second connections dependent upon the communication received from said programming device.

21 Claims, 7 Drawing Sheets

(58) Field of Classification Search
USPC ........................................................ 340/9.16
See application file for complete search history.

(56) References Cited

U.S. PATENT DOCUMENTS

| | | | | |
|---|---|---|---|---|
| 2004/0217718 | A1* | 11/2004 | Kumar | ............... H05B 37/0272 315/291 |
| 2005/0067982 | A1* | 3/2005 | Pilz | .................... H05B 37/0254 315/294 |
| 2006/0202851 | A1* | 9/2006 | Cash | .................. H05B 37/0272 340/12.23 |
| 2007/0018783 | A1* | 1/2007 | Erhardt | ............. H05B 37/0254 340/3.5 |
| 2009/0066266 | A1* | 3/2009 | Jungwirth | .......... H05B 33/0815 315/307 |
| 2010/0320940 | A1* | 12/2010 | Salm | ..................... H05B 37/02 315/312 |

FOREIGN PATENT DOCUMENTS

| | | |
|---|---|---|
| WO | 2005/025277 | 3/2005 |
| WO | 2009/090601 | 7/2009 |

\* cited by examiner

SYSTEM FOR CONFIGURING A LIGHTING CONTROL DEVICE OR THE LIKE IN A NETWORK OF LIGHTING CONTROL DEVICES

This application is a national phase of International Application No. PCT/GB2010/051011 filed Jun. 18, 2010 and published in the English language.

FIELD OF THE INVENTION

The invention relates to a system of addressing lighting control devices or the like, addressers and/or methods of configuring a network. The term "lighting control devices" is to be interpreted broadly in order to include ballasts, dimmers, and interfaces.

BACKGROUND TO THE INVENTION

Addressing lighting control devices (for example ballasts, dimmers, illumination devices and interfaces) is a complex procedure that often involves a computer and dedicated commissioning software. This is particularly true with a DALI (digital addressing lighting interface) system or one that has similar means of addressing for controlling lighting devices in buildings. DALI was brought about as a successor to other protocols for controlling lighting, such as the 1-10 volts analogue control system and the Digital Signal Interface (DSI). Each piece of operating equipment incorporating a DALI interface can be communicated over the DALI system individually. A typical system is shown in FIG. 1 in the form of a DALI bus with a plurality of electronic ballasts or lighting control devices. This communication may be in the form of a bidirectional data exchange, in which for example a DALI controller can query and set the status of each lighting control device within a light network. Each device in a DALI system has a unique long address and a short address that can be assigned by a user, programmer or site commissioning engineer. Currently procedures for setting up the short address and group(s) are tedious and complicated.

A major problem with DALI based automated lighting systems is that as an installation becomes older, the lighting control devices, such ballasts, tend to fail and therefore require replacing. DALI ballasts have no straightforward replacement procedure as such and unlike other types of automated lighting systems or technologies when initially installed a DALI ballast has a unique address assigned and programmed into it. A replacement DALI ballast must be assigned the same short address as the original ballast. Some DALI systems can achieve this automatically when replacing a single DALI ballast, but when more than one ballast has failed often the entire system needs re-configuring, making the replacement of faulty units time consuming and confusing. The present invention, at least in its preferred embodiments, seeks to address this problem.

SUMMARY OF THE INVENTION

In a first broad independent aspect, the invention provides an addresser for configuring an electronic ballast/lighting control device or the like in a network of lighting control devices; said addresser comprising a first connection to allow the receipt of communication from a controller such as a DALI controller; a second connection to allow communication from the addresser to electronic ballast/lighting control device or the like; an interface for communicating with a communication device such as a programming device; and means for configuring the communication between said first and second connections dependent upon the communication received from said communication device.

The addresser is particularly advantageous because whether the system employs a powered or an unpowered addresser, it enable a new illumination device or associated ballast to be easily replaced. Once the new device is installed, the addresser may then connect to the new device without the requirement of reprogramming the DALI network address and associated group, therefore simplifying the process of setting the short address and groups in a system. Also, the maintenance of lighting networks is also rendered less complicated.

Another advantage is that addresser will provides the means of communicating to new illumination devices or associated ballasts, which does not incorporate a compatible DALI interface, from a DALI network.

In a subsidiary aspect, the addresser further comprises a means for storing an address.

In a further subsidiary aspect, the addresser further comprises a connection for powering the addresser from said programming device.

In a further subsidiary aspect, said addresser further comprises an interface means to said programming device for monitoring the configuration of said electronic ballast/lighting control device and/or said addresser.

In a further subsidiary aspect, said addresser further comprises a selection means for selecting a communication interface for communicating information from said addresser to said electronic ballast/lighting control device.

In a further subsidiary aspect, said addresser further comprises a translation means for translating information from a first language to a second language for use with said electronic ballast/lighting control device.

In a further subsidiary aspect, said addresser further comprises a switching means for disconnecting the electrical power to said corresponding electronic ballast/lighting control device.

In a further subsidiary aspect, said addresser receives information indicative of switching off said corresponding electronic ballast/lighting control device and activating said switching means accordingly.

In a second broad independent aspect, a system for configuring an electronic ballast/lighting control device in a network of electronic ballasts/lighting control devices comprising:
  a controller for communicating information across the network of electronic ballasts/lighting control devices;
  a number of addressers corresponding to electronic ballasts/lighting control devices; and
  said addressers comprising a first connection to allow the receipt of communication from said controller; a second connection to allow communication from an addresser to an electronic ballast/lighting control device; an interface for communicating with a programming device; and means for configuring the communication between said first and second connections dependent upon the communication received from said programming device.

In a subsidiary aspect, said addressers comprise means for storing an address.

In a further subsidiary aspect, said addressers comprise a connection for being powered by said programming device.

In a further subsidiary aspect, said addressers further comprise a selection means for selecting a communication interface for communicating information from said addresser to said electronic ballast/lighting control device.

In a further subsidiary aspect, said addressers further comprise a translation means for translating information from a first language to a second language for use with said electronic ballast/lighting control device.

In a further subsidiary aspect, said addressers further comprise an interface means to said programming device for monitoring the configuration of said electronic ballast/lighting control device and/or said addresser.

In a further subsidiary aspect, said addressers further comprise a switching means for disconnecting the electrical power to said corresponding electronic ballast/lighting control device.

In a further subsidiary aspect, said addressers receive information indicative of switching off said corresponding lighting control device and activating said switching means accordingly.

In a third broad independent aspect, a method for configuring an electronic addresser/lighting control device in a network of electronic addressers/lighting control devices equipped with a controller for communicating across the network; comprising the steps of:

installing an addresser corresponding to an individual lighting control device; wherein said addresser configures an electronic ballast/lighting control device in a network of electronic ballasts/lighting control devices; said addresser comprising a first connection to allow the receipt of communication from a controller; a second connection to allow communication from the addresser to an individual electronic ballast/lighting control device; an interface for communicating with a programming device; and means for configuring the communication between said first and second connections dependent upon the communication received from said programming device; and employing a programming device for configuring said addresser to enable communication from said controller to said corresponding lighting control device.

In a subsidiary aspect, the method further comprises the step of communicating an address to said addresser.

In a further subsidiary aspect, the method further comprises the step of powering said addresser by said programming device.

In a further subsidiary aspect, the method further comprises the step of selecting a communication interface for communicating information from said addresser to said electronic ballast/lighting control device.

In a further subsidiary aspect, the method further comprises a step of translating information from a first language to a second language for use with said electronic ballast/lighting control device.

In a further subsidiary aspect, the method further comprises a step of monitoring the configuration of the network and/or said electronic ballast/lighting control device by communicating with said addresser.

In a further subsidiary aspect, the method further comprises a step of disconnecting the electrical power to said corresponding said electronic ballast/lighting control device by a switching means incorporated within said addresser.

In a further subsidiary aspect, the method further comprises the step of receiving information indicative of switching off said corresponding electronic ballast/lighting control device and activating said switching means accordingly.

In a fourth broad independent aspect, the invention provides a system for configuring a lighting control device or the like in a network of lighting control devices comprising:

a controller such as a DALI controller for communicating information across the network of lighting control devices;
  an individual addresser corresponding to an individual lighting control device;
  said addresser being configured to respond to a communication device; and being configured to enable the communication from said controller to said corresponding lighting control device.

This configuration is particularly advantageous because it simplifies the process of setting the short address and groups in a system.

In a subsidiary aspect, the system incorporates a communication link between the communication device and the addresser which is selected from the group comprising wired, infrared, or radio connection.

In a further subsidiary aspect in accordance with the first broad independent aspect, the communication device may be used to power the addresser during any routine maintenance or replacement of a device. This configuration is advantageous because it allows a user to interrogate or configure a DALI network address for a lighting control device such as a ballast without the lighting network or the device itself being powered.

In a further subsidiary aspect, the communication device may also be used to interrogate or configure a DALI network address for an illumination device whilst the lighting network is powered.

In a further subsidiary aspect, the addresser further comprises a selection means for selecting a communication interface for communicating information from the addresser to the lighting control device or the like. This configuration allows the addresser to operate in accordance with a plurality of modes of operation.

In a further subsidiary aspect, the addresser may for example select from four different modes such as DALI Broadcast, DALI Bidirectional, DSI and 1-10 Volt analogue.

In a further subsidiary aspect, the addresser further comprises a translation means for translating information from a first language to a second language for use with a lighting control device or the like. This configuration is particularly advantageous since it allows for example communication between a DALI controller and a lighting control device which would ordinarily only understand DSI. Similarly, this would allow a DALI controller to communicate with a lighting control device which would ordinarily only respond to an analogue signal.

In a further subsidiary aspect, the addresser incorporates means for storing address and/or group information. This is particularly advantageous since it doesn't require the lighting control device to be addressed.

In a further subsidiary aspect, the addresser incorporates means for transferring data from the communication device to the lighting control device in order to store address and/or group information on said lighting control device. This is particularly advantageous because it simplifies the addressing process.

In a further subsidiary aspect, the addresser further comprises an interface for communication with said communication device which is configured to allow the communication device to monitor the configuration of said lighting control device. This configuration is particularly advantageous since it would for example allow the communication device to be used to read the address and group information from installed devices.

In a further subsidiary aspect, said interface for communication to said communication device is configured to communicate information which is indicative of a system configuration. This configuration is particularly advantageous because it allows for example the address and group information to be configured from a replacement device.

In a further subsidiary aspect, said addresser further comprises a switching means for disconnecting the electrical power to said corresponding lighting control device. This configuration is particularly advantageous because it enables the corresponding lighting control device to switch off when not in use, therefore making the system more efficient in regards to resource and operating costs.

In a further subsidiary aspect, said addresser receives information indicative of switching off said corresponding lighting control device and activating said switching means accordingly. This configuration is particularly advantageous because it enables the electrical to the lighting control device to switched on and off automatically, therefore providing electrical safety when maintaining or replacing the corresponding lighting control device.

In a fifth broad independent aspect, the invention provides a method of configuring a lighting control device or the like in a network of lighting control devices equipped with a controller such as a DALI controller for communicating across the network; comprising the steps of:
  installing an addresser corresponding to an individual lighting control device; and
  employing a communication device for configuring said addresser to enable communication from said controller to said corresponding lighting control device.

In a subsidiary aspect, the method further comprises the step of selecting a communication interface for communicating information from the addresser to the lighting control device.

In a further subsidiary aspect, the method further comprises a step of translating information from a first language to a second language for use with a lighting control device.

In a further subsidiary aspect, the method further comprises a step of monitoring the configuration of the system and/or lighting control device by communicating with said addresser.

In a further subsidiary aspect, the method further comprises a step of disconnecting the electrical power to said corresponding lighting control device by a switching means incorporated within said addresser.

In a further subsidiary aspect, the method further comprises the step of receiving information indicative of switching off said corresponding lighting control device and activating said switching means accordingly.

DETAILED DESCRIPTION OF THE FIGURES

Figure 1:
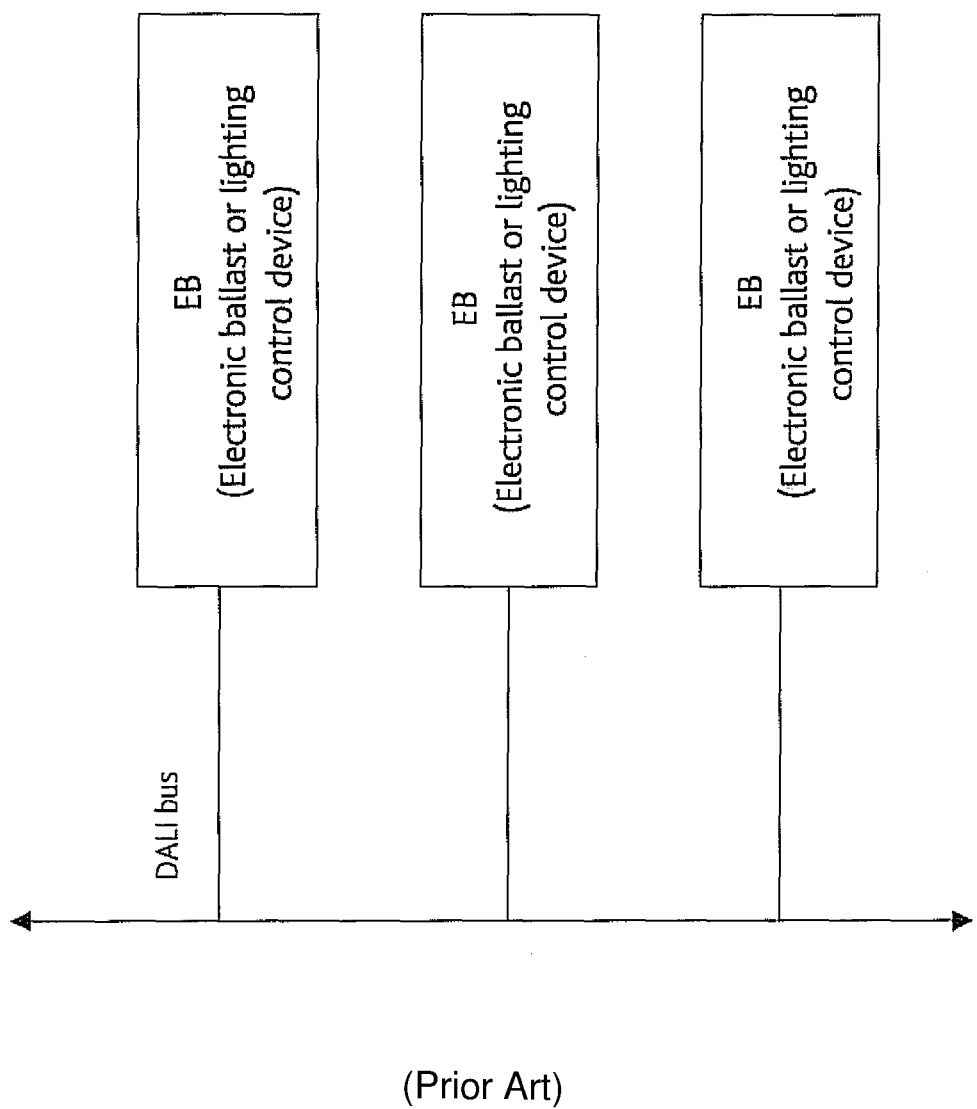
FIG. 1 shows a system block diagram representing the components of a known lighting network incorporating a DALI bus; the section entitled "Background to the Invention" refers to known systems of this kind.
Figure 2:
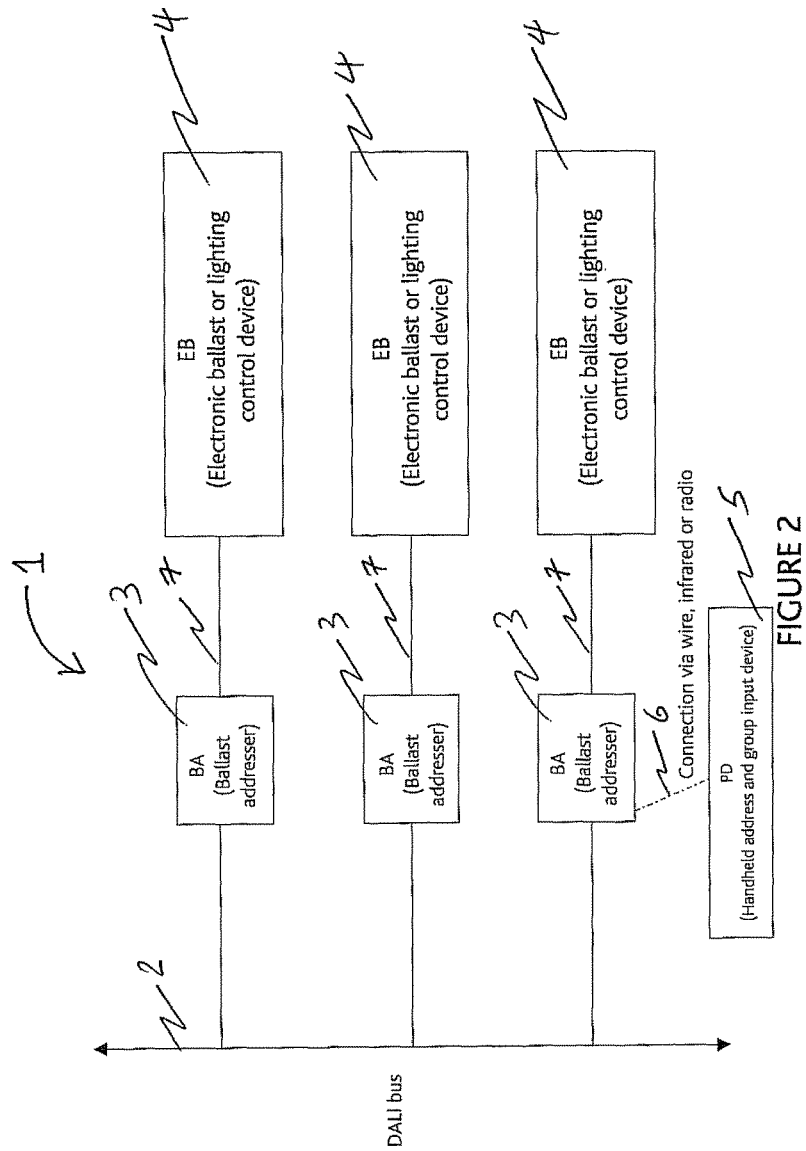
FIG. 2 shows a system block diagram representing the components of a lighting system according to an embodiment of the invention.

FIG. 2 shows a block diagram of a system for configuring lighting control devices or illumination devices 1. The system incorporates a DALI bidirectional bus 2 connected to three ballast addresser units 3. Each of the three ballast addresser units 3 are connected to a corresponding electronic ballast/lighting control device 4. A programming device 5 is shown to be connected to a ballast addresser unit 3.

The system 1 represents an embodiment of the invention, in which each addresser unit 3 filters information from the DALI bidirectional bus 2, to each corresponding electronic ballast/lighting control device 4. The information originates from a DALI gateway/controller or the like (not shown). The connection 6 between the programming device 5 and a ballast addresser unit 3 may be typically via a wire, infrared or wireless radio link. The programming device 5 will display to the user, the connected ballast addresser's assigned short DALI address and group. The programming device 5 will enable the user to manually select the required DALI address and group membership and then write them to the device. The programming device 5 will enable the user to read and display the DALI address of an existing device installed within a DALI lighting network. With the provision of an addresser, the DALI address of a ballast becomes irrelevant and is not used. The process assigns a short address to the addresser, the addresser then reads in the commands over the DALI bus and sends them as a broadcast to the connected ballast. Each addresser unit 3 incorporates a configurable interface 7 which communicates information with each corresponding electronic ballast/lighting control device 4. The configurable interface 7 has four selectable communication protocols for establishing communication to the corresponding electronic ballast/lighting control device 4. These protocols are:
  DALI Broadcast mode;
  DALI Bidirectional mode (DALI Bidirectional mode does not require a DALI ballast address either since it sends a broadcast request for information and then reads that information back in);
  DSI Broadcast; and
  1-10 Volt analogue control signal.

Figure 3:
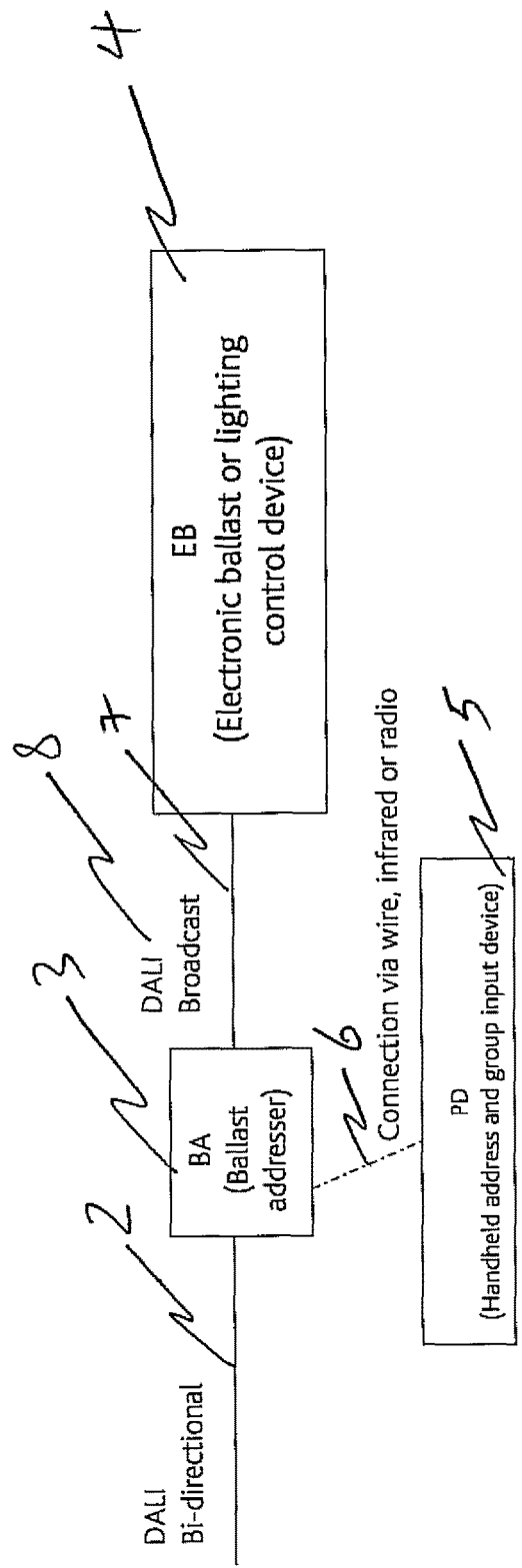
FIG. 3 shows a system block diagram representing the components of a lighting system according to a further embodiment incorporating a DALI interface to a lighting control device.

FIG. 3 shows a system block diagram in which the configurable interface 7 has been configured to utilise the DALI broadcast mode 8 for communicating information from the addresser unit 3 to a corresponding electronic ballast/lighting control device 4. The connection 6 between the programming device 5 and a ballast addresser unit 3 may be typically via a wire, infrared or wireless radio link. The programming device 5 programs the addresser unit with a short address and group(s) code, which are mapped into the DALI lighting network. The programming device 5 also configures the interface 7 from the addresser unit 3 to the corresponding electronic ballast/lighting control device 4 to function in the DALI protocol mode (unidirectional).

The addresser unit 3 receives information from the DALI bidirectional bus 2. The addresser unit 3 filters the information which has been addressed to the corresponding electronic ballast/lighting control device 4. The addresser unit 3 then broadcasts assigned DALI information to the corresponding electronic ballast/lighting control device 4. The filtering and termination process of the received addressed information is carried out within the addresser unit 3 and not within the corresponding electronic ballast/lighting control device 4.

Figure 4:
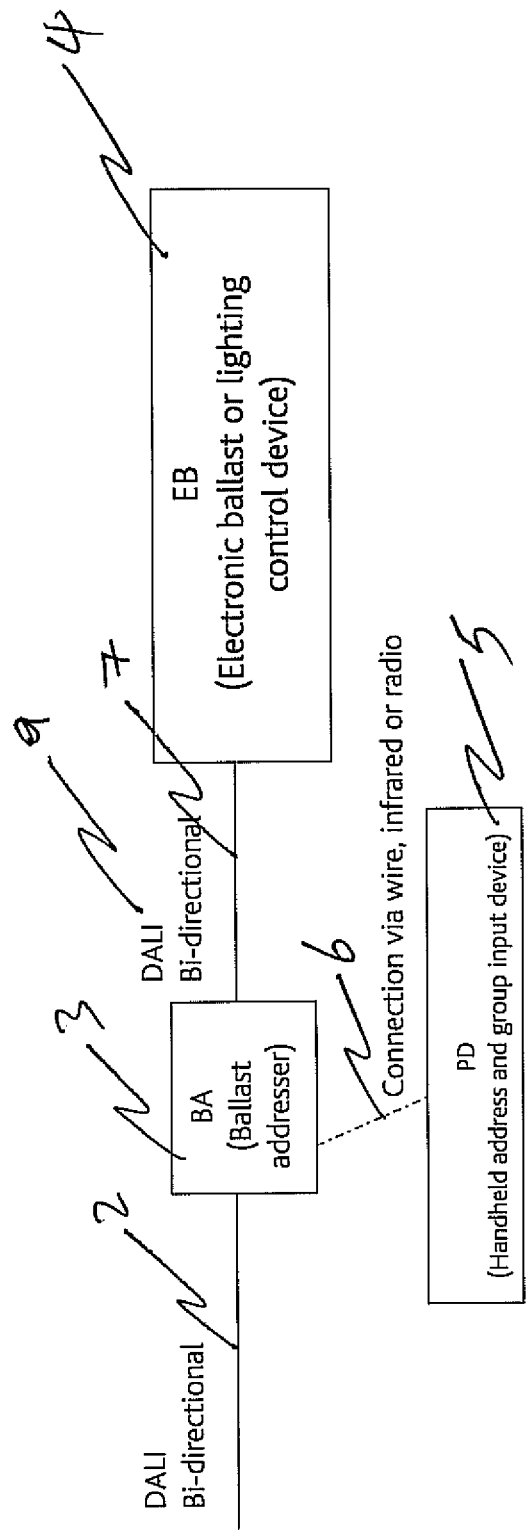
FIG. 4 shows a system block diagram representing the components of a lighting system according to a further embodiment incorporating a bi-directional DALI interface to a lighting control device.

FIG. 4 shows a system block diagram in which the configurable interface 7 has been configured to utilise the DALI Bidirectional mode 9 for communicating information from the addresser unit 3 to a corresponding electronic ballast/lighting control device 4. The connection 6 between the programming device 5 and a ballast addresser unit 3 may be typically via a wire, infrared or wireless radio link. The programming device 5 programs the corresponding electronic ballast/lighting control device 4 with a short address and group(s) code, which are mapped into the DALI lighting network. The programming device 5 also configures the interface 7 from the addresser unit 3 to the corresponding electronic ballast/lighting control device 4 to function in the DALI protocol mode (bidirectional).

The addresser unit 3 receives information from the DALI bidirectional bus 2. The addresser unit 3 enables the information received on the DALI bidirectional bus 2 to pass through the addresser unit 3 without applying any filtering to the received DALI information. The addresser unit then transmits the received DALI information to the corresponding electronic ballast/lighting control device 4. The filtering and termination process of the received addressed information is carried out within the corresponding electronic ballast/lighting control device 4 and not within the addresser unit 3. Status information from the corresponding electronic ballast/lighting control device 4 is transmitted back to the DALI bidirectional bus 2 via the addresser unit 3. This configuration renders the addresser unit 3 transparent to the DALI bidirectional data flowing through it.

Figure 5:
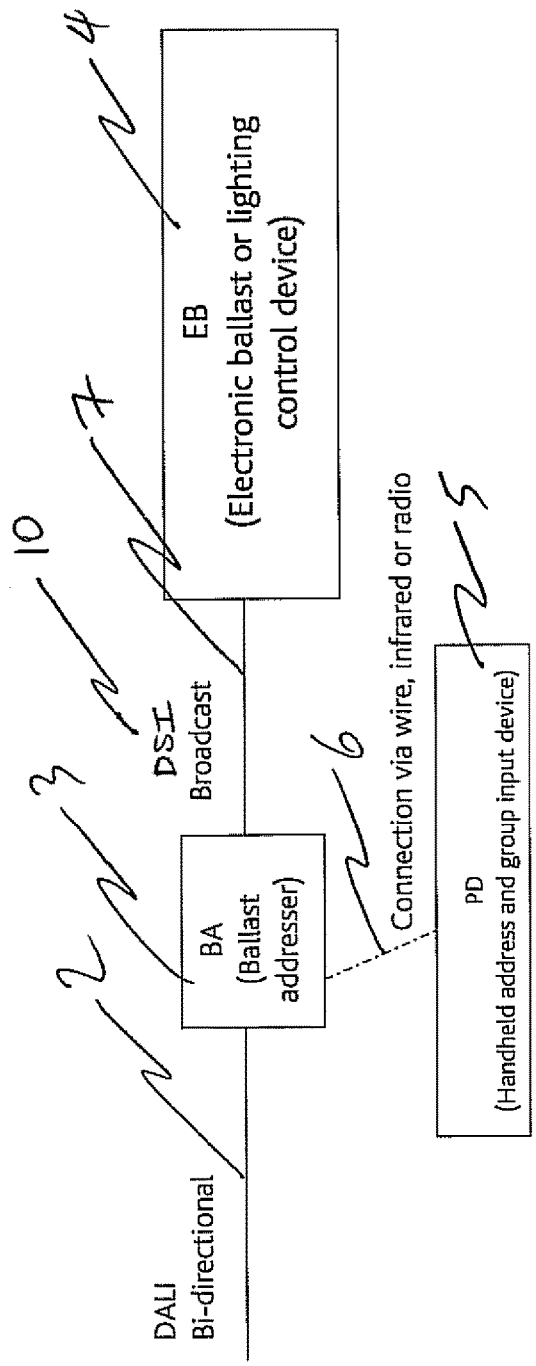
FIG. 5 shows a system block diagram representing the components of a lighting system according to a further embodiment incorporating a DSI interface to a lighting control device.

FIG. 5 shows a system block diagram in which the configurable interface 7 has been configured to utilise the DSI broadcast mode 10 for communicating information from the addresser unit 3 to a corresponding electronic ballast/lighting control device 4. The connection 6 between the programming device 5 and a ballast addresser unit 3 may be typically via a wire, infrared or wireless radio link. The programming device 5 programs the addresser unit with a short address and group(s) code, which are mapped into the DALI lighting network. The programming device 5 also configures the interface 7 from the addresser unit 3 to the corresponding electronic ballast/lighting control device 4 to function in the DSI protocol mode.

The addresser unit 3 receives information from the DALI bidirectional bus 2. The addresser unit 3 filters the information which has been addressed to the corresponding electronic ballast/lighting control device 4. The addresser unit 3 then translates the received DALI information into a DSI Broadcast protocol. The addresser unit 3 broadcasts the DSI information to the corresponding electronic ballast/lighting control device 4. The filtering and termination process of the received addressed information is carried out within the addresser unit 3 and not within the corresponding electronic ballast/lighting control device 4.

Figure 6:
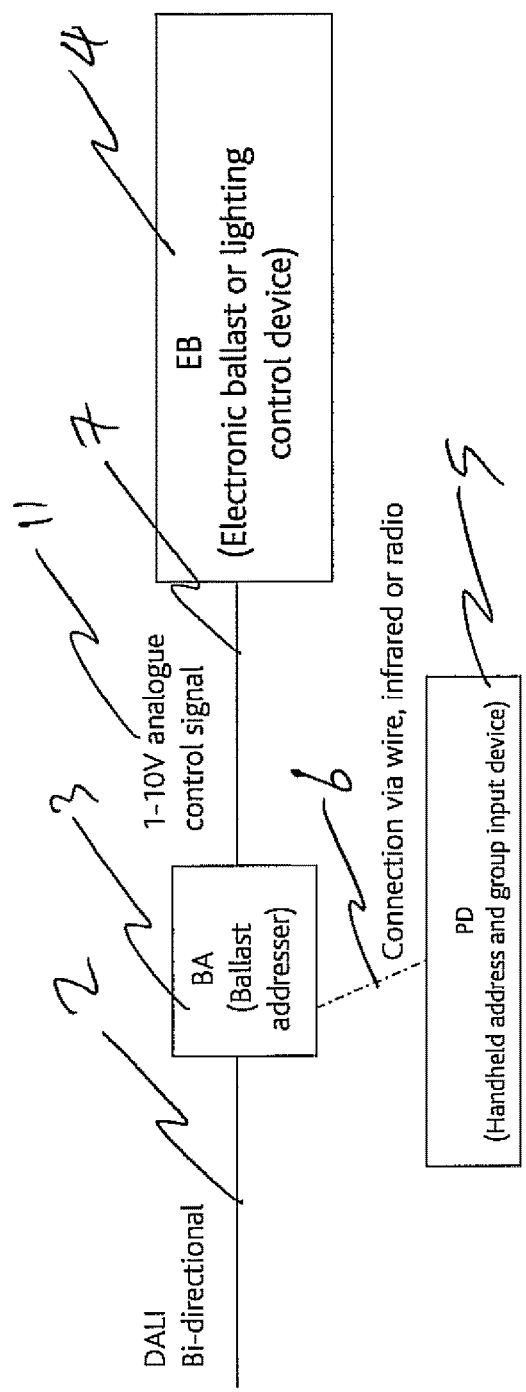
FIG. 6 shows a system block diagram representing the components of a lighting system according to a further embodiment incorporating a 1-10 volt analogue control signal to lighting control device.

FIG. 6 shows a system block diagram in which the configurable interface 7 has been configured to utilise the 1-10 Volt analogue control signal 11 for communicating information from the addresser unit 3 to a corresponding electronic ballast/lighting control device 4. The connection 6 between the programming device 5 and a ballast addresser unit 3 may be typically via a wire, infrared or wireless radio link. The programming device 5 programs the addresser unit with a short address and group(s) code, which are mapped into the DALI lighting network. The programming device 5 also configures the interface 7 from the addresser unit 3 to the corresponding electronic ballast/lighting control device 4 to function in the 1-10 Volt analogue signal protocol mode.

The addresser unit 3 receives information from the DALI bidirectional bus 2. The addresser unit 3 filters the information which has been addressed to the corresponding electronic ballast/lighting control device 4. The addresser unit 3 then translates the received DALI information into a 1-10 Volt analogue control signal. The addresser unit 3 broadcasts the analogue information to the corresponding electronic ballast/lighting control device 4. The filtering of the received addressed information is carried out within the addresser unit 3 and not within the corresponding electronic ballast/lighting control device. In this mode, the addresser preferably incorporates a switching device to turn off the power supply to the ballast. This would allow a lighting control device of this kind to be switched off as well as to dim.

The additional benefits given by the system 1 are that they simplify the changing of corresponding electronic ballast/lighting control devices, when they fail due to their end of life within an existing installation.

The corresponding electronic ballast/lighting control device can be addressed without the ballast or system being powered. If a battery powered programming device is connected via wires to the electronic ballast/lighting control devices, then the programming device can be used to set the address and group(s) whether there is power on the DALI lighting network or power to the electronic ballast.

When an electronic ballast/lighting control device is changed, the ballast addresser will be moved across to the new fitting/ballast, for easy replacement.

Figure 7:
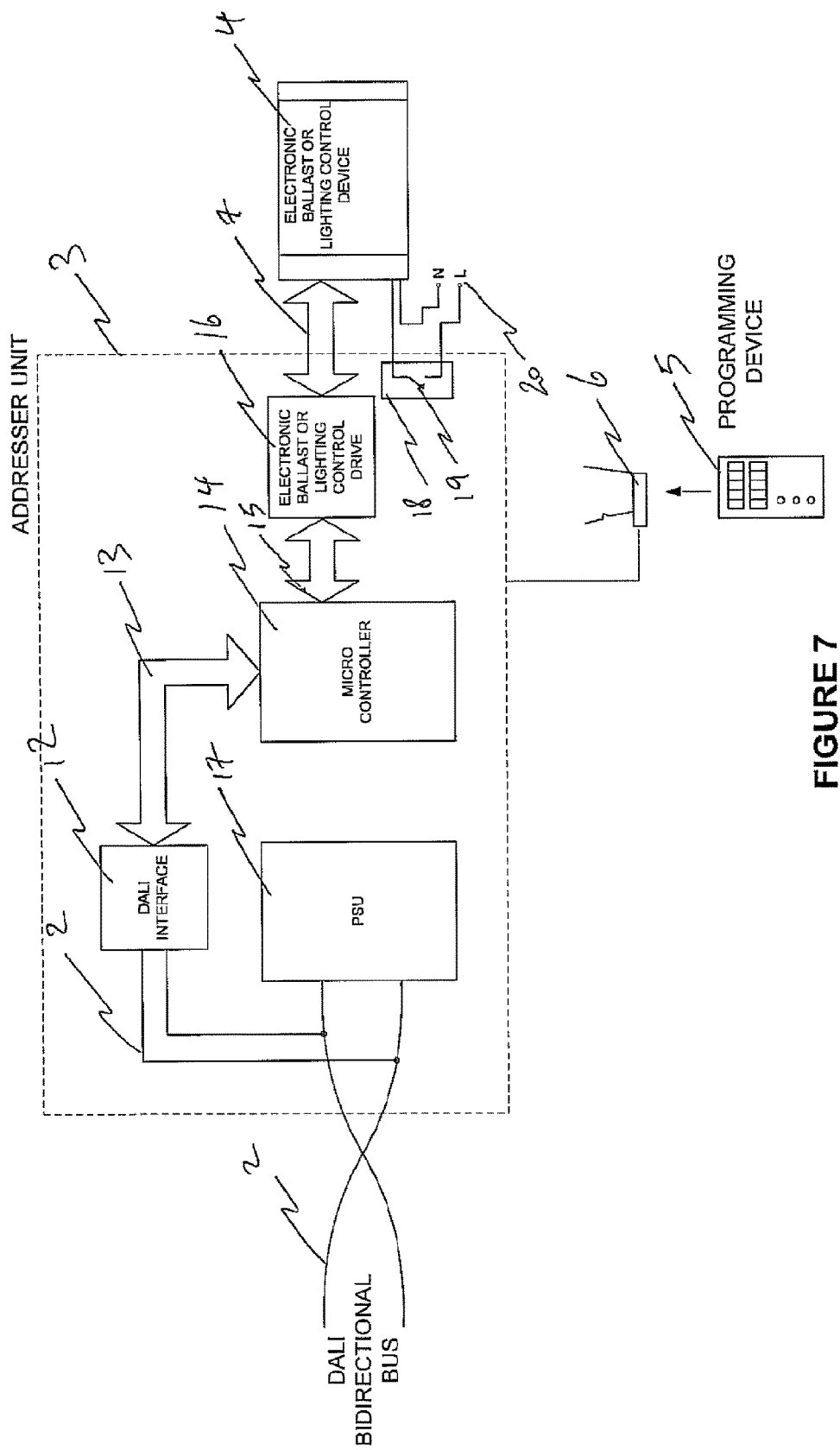
FIG. 7 shows a block diagram of the components of an addresser unit.

FIG. 7 shows a system block diagram which illustrates an exploded view of the main functional components within the addresser unit 3. These components are a DALI interface 12, a microcontroller 14, a bidirectional information bus 13 connecting the DALI Interface 12 to the Microcontroller 14, an electronic ballast or lighting control drive 16, a bidirectional information bus 15 connecting the microcontroller 14 to the electronic ballast or lighting control drive 16, a configurable interface 7 connecting the electronic ballast or lighting control drive 16 to an electronic ballast or lighting control device 4, a power supply unit 17, a bidirectional link 6 between the programming device 5 and a ballast addresser unit 3 which may be typically via a wire, infrared or wireless radio link and a relay switching device 18, which may be either a latching or non-latching relay device. The relay switching device 18 is shown to incorporate a "normally open" electrical contact switch 19 within the live electrical supply 20 to the electronic ballast or lighting control device 4.

The programming device 5, in FIGS. 2 to 7, may also be used to power the addresser unit 3 via a wire connection (not shown) during installation, maintenance or replacement of a addresser unit 3 and/or electronic ballast or lighting control device 4.

In use, bidirectional information is communicated on the DALI bidirectional bus 2 to the intended electronic ballast or lighting control device 4 within a lighting network, via the addresser unit 3. The information received by the DALI interface component 12 within the ballast addresser 3 is converted from DALI bus signals into voltage levels suitable for use with the microcontroller 14. The DALI interface component 12 also reverses this process by converting signals received from the microcontroller into DALI bus signals. The information received by the microcontroller 14, which has been addressed to the corresponding electronic ballast or lighting control device 4, is then filtered through onto the bidirectional information bus 15. The microcontroller 14 will not filter through information addressed to other ballasts or lighting devices within the lighting network. The microcontroller 14 communicates additional configuration information onto the bidirectional information bus 15. The electronic ballast or lighting control drive 16 prepares the signal for transmission across the configurable interface 7.

The microcontroller may translate the information it receives in order to be receivable by the electronic ballast or lighting control device 4, such as DALI Broadcast mode, DALI Bidirectional mode, DSI Broadcast and a 1-10 Volt analogue control signal.

A programming device 5 is connected to the microcontroller 14 via a bidirectional connection 6 with the microcontroller 14 for monitoring and configuring the addresser unit 3. This includes monitoring and configuring the addresser unit's DALI network and group(s) addresses within the lighting system and configuring the communication protocols of the configurable interface 7.

The addresser unit 3 has an incorporated power supply unit which powers all the addresser's internal components, buses and interfaces.

The switching device 18, within the addresser unit 3 prevents electrical power from being parasitically consumed by the electronic ballast or lighting control device 4. The addresser unit 3 monitors and passes DALI commands to the electronic ballast or lighting control device 4. If the addresser unit 3 detects an 'off' command, the ballast addresser 3 opens the electrical contact switch 19, therefore halting and disconnecting the electrical power to the electronic ballast or lighting control device 4. This feature gives environmental advantages and also ensures electrical safety at the electronic ballast or lighting control device 4 when they are turned off. Improved safety and isolation maybe achieved by incorporating a two pole relay switch which utilises an additional electrical contact switch, in the form of a within the negative electrical supply 20 from the electronic ballast or lighting control device 4.

The invention claimed is:

1. An addresser for configuring an addressable electronic ballast/lighting control device in a network of addressable electronic ballasts/lighting control devices; said addresser comprising:
   a first data connection to allow communication of lighting control information between said addressor and a controller;
   a second data connection to allow communication of lighting control information from the addresser to at least one addressable electronic ballast/lighting control device; and
   a programming interface;
   wherein the communication between said first and second data connections is dependent upon the communication received via said programming interface; and
   wherein the lighting control information is broadcast from the addresser to said addressable electronic ballast/lighting control device; and
   further comprising a connection for powering the addresser from a programming device, where the programming device communicates to the addresser via said programming interface.

2. An addresser according to claim 1, comprising means for storing an address.

3. An addresser in accordance with claim 1, wherein said addresser further comprises an interface to said programming device for monitoring the configuration of said electronic ballast/lighting control device and/or said addresser.

4. An addresser according to claim 1, further comprising a selector for selecting a communication interface for communicating information from said addresser to said electronic ballast/lighting control device.

5. An addresser according to claim 1, further comprising a translator for translating information from a first language to a second language for use with said electronic ballast/lighting control device.

6. An addresser according to claim 1, further comprising a switch for disconnecting the electrical power to said corresponding electronic ballast/lighting control device.

7. An addresser according to claim 6, wherein said addresser receives information indicative of switching off said corresponding electronic ballast/lighting control device and activating said switch accordingly.

8. A system for configuring an addressable electronic ballast/lighting control device in a network of addressable electronic ballasts/lighting control devices comprising:
   a controller for communicating lighting control information across the network of addressable electronic ballasts/lighting control devices; and
   at least one addresser in data communication with at least one of the addressable electronic ballasts/lighting control devices; said addresser comprising:
      a first data connection to allow communication of lighting control information between said controller and said addresser;
      a second data connection to allow communication of lighting control information between the addresser and said at least one of the addressable electronic ballasts/lighting control devices; and
      a programming interface;
      wherein the communication between said first and second data connections is dependent upon the communication received via said programming interface;
      wherein said lighting control information is broadcast from the addresser to said at least one of said addressable electronic ballasts/lighting control devices; and
      wherein said addresser comprises a connection for being powered by a programming device, where the programming device communicates to the addresser via said programming interface.

9. A system according to claim 8, wherein said addresser comprises an address storage.

10. A system according to claim 8, wherein said addresser further comprises a selector for selecting a communication interface for communicating information from said addresser to said electronic ballast/lighting control device.

11. A system in accordance with claim 8, wherein said addresser further comprises a translator for translating information from a first language to a second language for use with said electronic ballast/lighting control device.

12. A system in accordance with claim 8, wherein said addresser further comprises an interface to said programming device for monitoring the configuration of said electronic ballast/lighting control device and/or said addresser.

13. A system in accordance with claim 8, wherein said addresser further comprises a switch for disconnecting the electrical power to said corresponding electronic ballast/lighting control device.

14. A system in accordance with claim 13, wherein said addresser receives information indicative of switching off said corresponding lighting control device and activating said switch accordingly.

15. A method for configuring lighting control information communicated to an addressable lighting control device in a network of lighting control devices equipped with a controller for communicating across the network; comprising the steps of:
 installing an addresser in data communication with at least one addressable lighting control device; said addresser comprising a first data connection to allow communication of lighting control information between said controller and said addresser; a second data connection to allow communication of lighting control information between the addresser and the addressable lighting control device; and a programming interface; the addresser receiving addressed lighting control information;
 configuring the received lighting control information dependent on the communication received via said programming interface;
 broadcasting said lighting control information from the addresser to said addressable lighting control devices; and
 powering said addresser by a programming device, where the programming device communicates to the addresser via said programming interface.

16. A method according to claim 15, comprising the step of communicating an address to said addresser.

17. A method according to claim 15, further comprising the step of selecting a communication interface for communicating information from said addresser to said electronic ballast/lighting control device.

18. A method according to claim 15, further comprising a step of translating information from a first language to a second language for use with said electronic ballast/lighting control device.

19. A method according to claim 15, further comprising a step of monitoring the configuration of the network and/or said electronic ballast/lighting control device by communicating with said addresser.

20. A method in accordance with claim 15, further comprising a step of disconnecting the electrical power to said corresponding said electronic ballast/lighting control device by a switch incorporated within said addresser.

21. A method in accordance with claim 20, further comprising the step of receiving information indicative of switching off said corresponding electronic ballast/lighting control device and activating said switch accordingly.

* * * * *